United States Patent
Mikoleizig

(10) Patent No.: US 9,346,105 B2
(45) Date of Patent: May 24, 2016

(54) DEVICE FOR CHUCKING A TOOL OR WORKPIECE AND METHOD FOR OPERATING SUCH A CHUCKING DEVICE

(71) Applicant: Klingelnberg AG, Zürich (CH)

(72) Inventor: Gunter Mikoleizig, Huckeswagen (DE)

(73) Assignee: Klingelnberg AG, Zurich (CH)

( * ) Notice: Subject to any disclaimer, the term of this patent is extended or adjusted under 35 U.S.C. 154(b) by 284 days.

(21) Appl. No.: 13/970,056

(22) Filed: Aug. 19, 2013

(65) Prior Publication Data

US 2014/0049011 A1    Feb. 20, 2014

(30) Foreign Application Priority Data

Aug. 20, 2012  (EP) ..................................... 12181075

(51) Int. Cl.
  *B23B 31/16*  (2006.01)
  *B23B 31/26*  (2006.01)
  (Continued)

(52) U.S. Cl.
  CPC ................. *B23B 31/26* (2013.01); *B23B 31/16* (2013.01); *B23B 31/28* (2013.01); *B23Q 3/12* (2013.01); *B23B 2231/42* (2013.01); *B23B 2260/07* (2013.01); *B23Q 17/005* (2013.01);
  (Continued)

(58) Field of Classification Search
  CPC ................. Y10T 279/21; Y10T 279/19; Y10T 279/1926; B23B 31/16; B23B 31/26; B23B 2231/42; B23B 2260/07; B23Q 3/12; B23Q 17/005; B23Q 17/2452
  USPC ............ 74/392, 395, 412 R, 413, 414, 421 R, 74/421 A, 400, 401, 403, 402
  See application file for complete search history.

(56) References Cited

U.S. PATENT DOCUMENTS

| 1,747,453 | A | * | 2/1930 | Mattison ................... B27C 7/04 142/55 |
| 2,582,408 | A | * | 1/1952 | Bauer ................... B23F 19/025 451/114 |
| 3,698,729 | A | * | 10/1972 | Scharfen ............. B23B 31/1607 279/114 |

(Continued)

FOREIGN PATENT DOCUMENTS

| DE | 3314629 A1 | 11/1983 | |
| DE | 102010018342 A1 | * 1/2012 | ........ B23B 31/16004 |
| EP | 554685 A1 | 8/1993 | |
| JP | 2001246511 A | 9/2001 | |

OTHER PUBLICATIONS

Machine translation of Germany Patent DE 10 2010 018 342 A1 issued to Wolfgang et al., Jan. 5, 2012.*

*Primary Examiner* — Eric A Gates
*Assistant Examiner* — Chwen-Wei Su
(74) *Attorney, Agent, or Firm* — McCarter & English, LLP

(57) ABSTRACT

A chucking device, which includes a rotationally-drivable spindle, a chucking means for mechanical chucking of a chucked object arranged on the spindle, a drive gearwheel, and a drive for rotationally driving the gearwheel. The chucking means has a rotating body, which has gear teeth and allows, through rotational movement, the chucked object to be chucked or unchucked. The drive gearwheel has gear teeth configured for complementary engagement with the gear teeth of the rotating body. The gear teeth of the rotating body and drive gearwheel are designed to provide flank play, such that the drive gearwheel can assume a neutral angular position with respect to the rotating body so that the gear teeth of the rotating body and drive gearwheel do not touch each other.

10 Claims, 2 Drawing Sheets

(51) Int. Cl.
  *B23Q 3/12* (2006.01)
  *B23B 31/28* (2006.01)
  *B23Q 17/00* (2006.01)
  *B23Q 17/24* (2006.01)
(52) U.S. Cl.
  CPC ....... *B23Q17/2452* (2013.01); *Y10T 29/49998* (2015.01); *Y10T 279/19* (2015.01); *Y10T 279/21* (2015.01); *Y10T 279/275* (2015.01)

(56) References Cited

U.S. PATENT DOCUMENTS

| | | | |
|---|---|---|---|
| 4,573,379 A | 3/1986 | Bald | |
| 2008/0034904 A1* | 2/2008 | Baker | B02C 17/24 74/89.36 |
| 2013/0154206 A1* | 6/2013 | Tiefenbock | B23B 31/16037 279/134 |

* cited by examiner

DEVICE FOR CHUCKING A TOOL OR WORKPIECE AND METHOD FOR OPERATING SUCH A CHUCKING DEVICE

CROSS-REFERENCE TO RELATED APPLICATIONS

This application claims priority under 35 U.S.C. §119(a)-(d) to European Patent Application No. EP 12 181 075.8, filed Aug. 20, 2012, which is hereby incorporated by reference in its entirety as part of the present disclosure as if fully set forth herein.

FIELD OF THE INVENTION

The present invention relates to devices for chucking a tool or a workpiece in a charging device, for example, as part of a machine tool or a measuring machine, and a method for operating a corresponding chucking device.

BACKGROUND OF THE INVENTION

There are numerous machining methods for producing precision parts, in which a workpiece is chucked in a chucking device of a machine tool. During chucking, it is important that the workpiece is held strongly enough in the chucking device so that it is not detached or displaced due to occurring machining forces. It is also important to know the precise chucking position of the workpiece in the chucking device and therefore in the machine tool so that a reference to the coordinate system of the machine tool can thus be produced, which is significant for precision of machining. For example, if a measuring machine is used, the workpiece can be scanned with high precision to ensure the workpiece is chucked so as to resist machining forces without play.

In some instances, where chucking occurs at least partially by manual handling of objects, the chucking of the objects can be very time-consuming and work intensive due to the manually intensive nature of at least some of the steps required for the chucking of the objects. For example, in the case of larger components, the manual handling thereof can be made more difficult because of the intrinsic weight or the dimensions of the components. Also, in the case of large piece counts (e.g., in mass production), manual handling can be disadvantageous because, for example, of the continual labor intensive handling of workpieces by operating personnel, a lack of precision in the chucking of an object and/or a lack of precision in an overall system (e.g., machine tool, measuring machine, or test stand).

SUMMARY OF THE INVENTION

The present invention is directed to a chuck or a chucking device, which allows automated chucking of an object where the chuck or the chucking device does not have any negative influence on the precision of an overall system (e.g., machine tool, measuring machine, or test stand). Also, as a result of the present invention, the handling efforts by operating personnel are reduced.

The chucking device is arranged on a rotationally-drivable spindle and arranged on the chucking means, which mechanically chucks a chucked object, is a chucked object. The chucking means comprise a rotating body, which allows the chucked object to be chucked or unchucked by the execution of a relative rotational movement of the rotating body with respect to the spindle. The chucking device is distinguished in that the rotating body has gear teeth, and the chucking device additionally has a drive gearwheel, which is provided with gear teeth which are designed as complementary to the gear teeth of the rotating body. The drive gearwheel is positioned to be engaged with the rotating body. In addition, the chucking device comprises a drive for the rotational driving of the drive gearwheel. The gear teeth of the rotating body are designed together with the gear teeth of the drive gearwheel with the provision of a flank play such that the drive gearwheel can assume a neutral angular position with respect to the rotating body, in which neither a leading nor a trailing tooth flank of the gear teeth of the drive gearwheel is in contact with the corresponding tooth flanks of the gear teeth of the rotating body.

In one embodiment, the chucking device, comprises a rotationally-drivable spindle, chucking means for mechanical chucking or unchucking a chucked object arranged on the spindle, a drive gearwheel and a drive for rotationally driving the drive gearwheel. The chucking means comprises a rotating body, which has gear teeth each with a leading tooth flank and a trailing tooth flank, which allows the chucked object to be chucked or un-chucked by execution of a relative rotational movement of the rotating body with respect to the spindle. The drive gearwheel is engagable with the rotating body and has gear teeth of the rotating body. Each of the drive gear wheel gear teeth have a leading tooth flank and a trailing tooth flank, which are complementary to the gear teeth of the rotating body such that the gear teeth of the rotating body and the gear teeth of the drive gearwheel define a flank play so as to define a neutral angular position of the gear wheel with respect to the rotating body in which the leading tooth flank and the trailing tooth flank of the gearwheel and the corresponding leading tooth flank and the trailing tooth flank of the rotating body are not in contact with each other.

In some embodiments, the rotating body is a component of chucking means constituting a lathe chuck.

In some embodiments, the drive gearwheel is movable, by means of the drive and a controller into the neutral angular position. Angle measuring sensors in the region of the rotating body and the drive gearwheel may be used for this purpose, which are linked to the controller by circuitry.

In some embodiments, the controller is configured to and ascertains (monitors) the power consumption of the drive of the drive gearwheel, in order to be able to ascertain successful chucking and/or the achievement of a (predefined) chucking force during the chucking from the power consumption of the drive. If the successful chucking and/or the achievement of a chucking force has been ascertained by the controller, in a following step, the rotating body is transferred by the controller into the neutral position relative to the drive gearwheel and held in this position.

The controller may interrupt the power supply of the drive as soon as the successful chucking and/or the achievement of a chucking force has been ascertained by the controller in order to then transfer the rotating body into the neutral position relative to the drive gearwheel.

Depending on the weight, material, length/diameter ratio, chucking depth, and other conditions, the chucking forces must be set higher or lower. A corresponding adaptation of the chucking forces is possible in that a corresponding specification is made to the controller.

In some embodiments, the system is a machine tool, a measuring machine, or a test stand. The invention may be suitable in a measuring or testing machine, since a possible influence of the drive of the drive gearwheel on the measurement or test can be precluded because of the neutral position. The invention may also be used in a machine tool when configured for high-precision (fine) machining of a workpiece or, for example, for dressing a tool. However, the influence of the drive gearwheel on the machining can create an interference. Therefore, the rotating body may be transferred into the neutral position relative to the drive gearwheel.

It is an advantage of the invention that it compensates for gear teeth inaccuracies (indexing/true running) via intentionally predefined flank play. In other words, precision manufacturing of the gear teeth of drive gearwheel and rotating body is not necessary. It is a further advantage of the invention that the chucking device, or the parts thereof, can be replaced in a relatively problem-free manner. It is yet a further advantage of the invention that the (auxiliary) drive and the drive gearwheel do not have any interfering effects on the running behavior of the spindle axis if the neutral angular position is maintained.

Other advantages of the present invention, and/or of the embodiments thereof, will become more readily apparent in view of the following detailed description of the embodiments and the accompanying drawings.

DETAILED DESCRIPTION OF EMBODIMENTS OF THE INVENTION

Figure 1A:
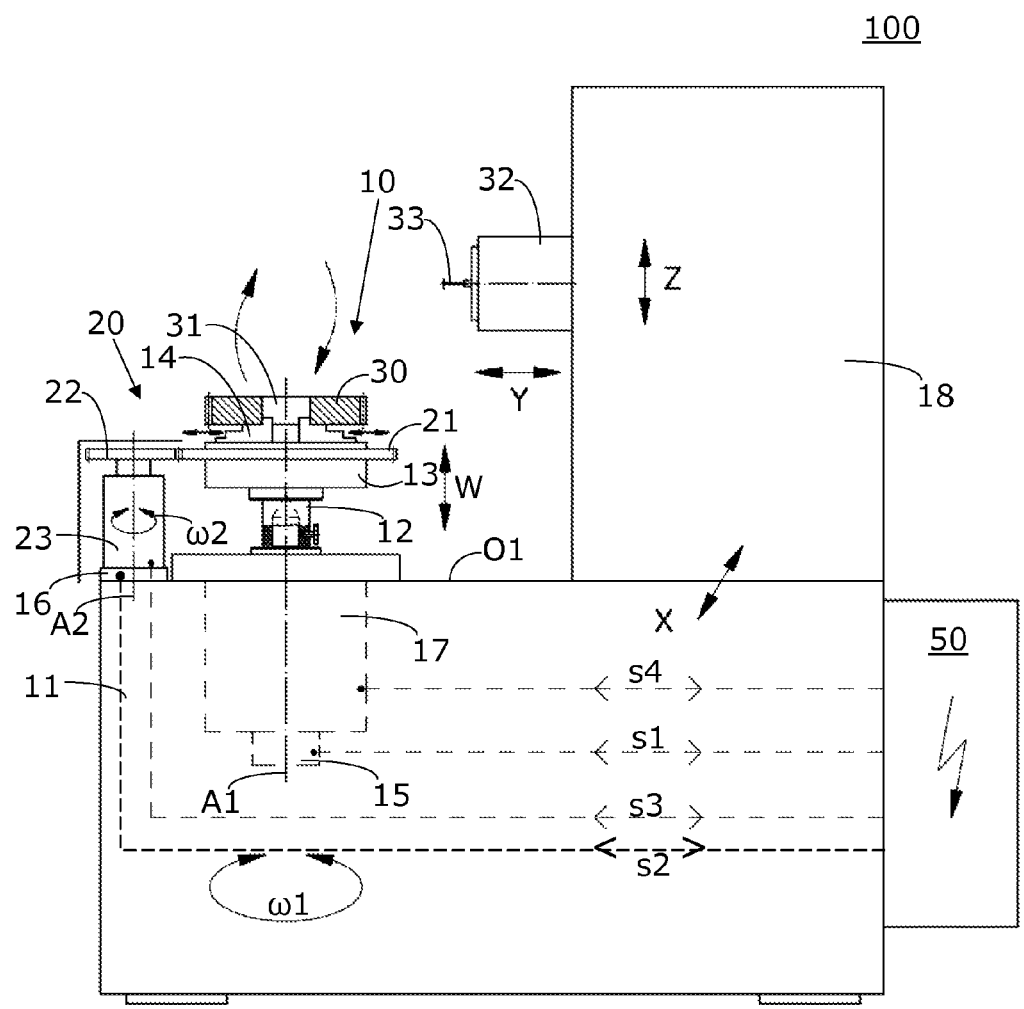
FIG. 1A is a schematic side view of a system equipped with a chucking device.

It is to be noted that the use of terms in conjunction with embodiments herein serve only for better understanding. The present invention and the scope of protection of the patent claims are not to be restricted in the interpretation thereof by the specific choice of the terms. The invention may be readily used with other systems and/or technical fields.

An overall system 100 includes a device 10, for example, a machine tool, a measuring machine, or a test stand. The system 100 is referred hereafter sometimes as a measuring machine 100 for convenience, though the invention is not limited to a measuring machine.

A programmable, computer-based controller 50, such as a CNC controller, performs control tasks directed by a computer system, e.g., a microcomputer. For this purpose, the controller 50 can include a numerical control (NC) program, which comprises a sequence of commands. The axes, or the drives thereof, respectively, of the overall system 100 can be configured to be controlled or regulated by the controller 50. The controller 50 can be a multi-axis controller, which may also control and regulate an auxiliary drive 23 in addition to control and regulate the axes of the overall system 100.

The chucking means 14 may be any type of mechanical means, which allow a chucked object, such as, for example, an externally toothed cylinder wheel 30, to be chucked or clamped. The chucking means 14 may not only operate using rotational movements, but also by triggering a movement or inducing a translated movement by the rotation, which causes the chucking of a chucked object 30 so as to, for example, fix a chucked object correctly and precisely in position on a spindle 12. Such chucking means 14 can include, without limitation, bit chucks, which are commonly used with drills and jaw chucks, which have chucking jaws 14.1, 14.2, 14.3 that are moved radially inward or outward in order to securely chuck a chucked object 30. As can be seen in one embodiment in FIG. 1, the chucking jaws 14.1, 14.2, 14.3 are used as the chucking means 14. FIG. 1A shows that the chucking jaws 14.1, 14.2, 14.3 engage in a central borehole 31 of a chucked object 30 (an externally-toothed cylinder wheel here) and clamp the chucked object 30, in that the chucking jaws 14.1, 14.2, 14.3 were moved radially outward.

The invention can be used for chucking or clamping manifold different objects (bodies) 30. The chucked object can be, inter alia, tools, workpieces, and measured objects (test subjects).

Figure 1B:
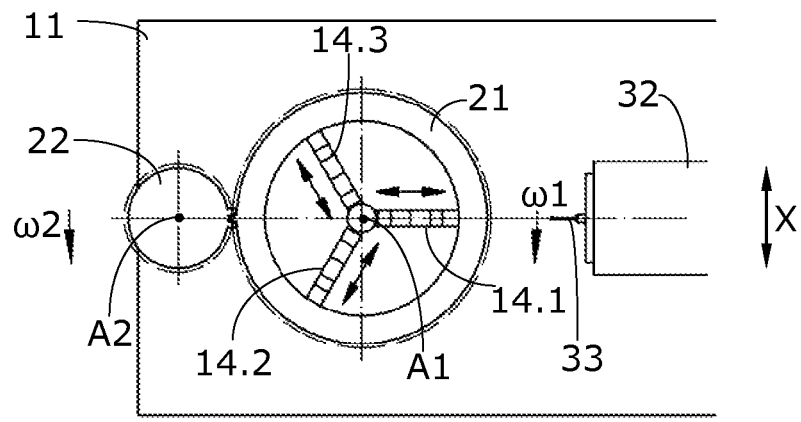
FIG. 1B is a partial, schematic top view of a part of the system of FIG. 1A.

Referring now to FIGS. 1A and 1B, details of an embodiment of a chucking device 10 will be described. The chucking device 10 is part of, e.g., a measuring machine 100, which comprises a machine table 11 and a tower-like measuring structure 18. A spindle 12, which has a spindle axis A1 that is perpendicular to a plane of the top side O1 of a machine table 11, is arranged on the top side O1 of the machine table 11. The spindle axis A1 is used here as a turntable measuring axis. A spindle (e.g., electric) drive 17, which is arranged in the interior of the measuring machine 100, is coupled to the spindle 12 such that a rotational movement $\omega 1$ of the spindle drive 17 rotates the spindle 12 about the spindle axis A1. A controller 50 is arranged on the measuring machine 100 and an angle-measuring sensor 15, which is operatively associated with the spindle 12 and is connected by circuitry to the controller 50, can be seated on the spindle drive 17. The circuitry connection between the angle-measuring sensor 15 and the controller 50 is designated with the reference sign s1.

As shown in FIG. 1A, the spindle 12 can comprise an adapter 13 with the chucking device 10 connected via the adapter 13 to the spindle 12. However, the chucking device 10 can also be connected directly to the spindle 12. The chucking device 10, the adapter 13, and the spindle 12 are arranged coaxially to the spindle axis A1 and rotate together around it when the controller 50 drives the spindle drive 17.

Figure 2A:
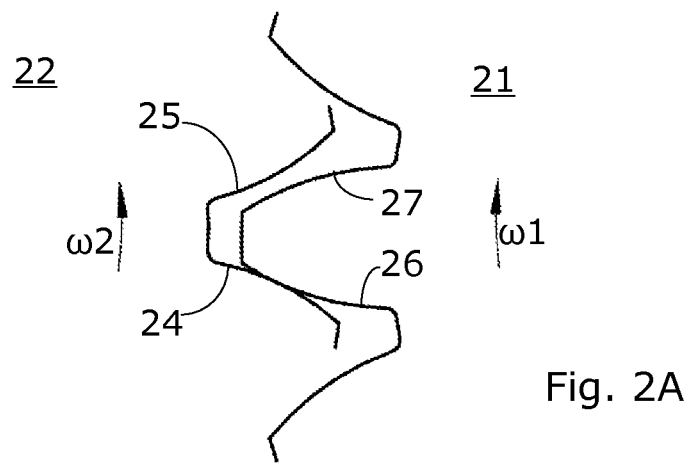
FIG. 2A is a schematic top view of a tooth gap of a drive gearwheel and a tooth of the rotating body where a flank of the gearwheel and a flank of the rotating body are in contact on one side.
Figure 2B:
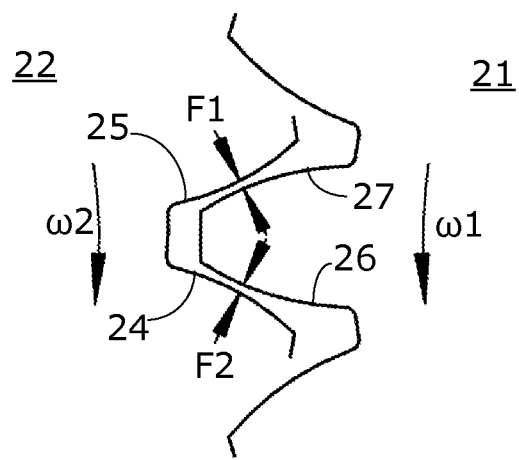
FIG. 2B is a schematic top view of the tooth gap of the drive gearwheel and the tooth of the rotating body where the drive gearwheel is in a neutral angular position with respect to the rotating body.

In the region of the spindle 12, a rotating body 21 is arranged, which may have a ring shape with external gear teeth (See FIGS. 2A, 2B). In addition to or instead of the external gear teeth, the rotating body 21 can have internal gear teeth. By rotating the rotating body 21 with respect to the spindle 12, a chucked object 30 can be chucked (or clamped) or unchucked (or disengaged). This procedure and the interaction of the mechanical elements is well-known from practice and will therefore not be explained in greater detail here. In FIG. 1A, an operating direction of a chuck change, or a direction of the removal and placement of a chucked object 30, is identified by a double arrow designed W.

A drive gearwheel 22 is arranged in the vicinity of the spindle 12. The drive gearwheel 22 has external and/or internal gear teeth that are configured and arranged to be complimentary to the gear teeth of the rotating body 21. In a normal state, the drive gearwheel 22 is arranged such that the gear teeth of the drive gearwheel 22 are engaged with the gear teeth of the rotating body 21 and at least one gear tooth of the rotating body 21 is always arranged in a tooth gap of the gear teeth of the drive gearwheel 22. Similarly, as can be seen in FIGS. 2A and 2B, at least one gear tooth of the drive gearwheel 22 is always in a tooth gap of the gear teeth of the rotating body 21. In some embodiments, the drive wheel 22 is a spur gear and the rotating body 21 is a pinion, and as substantially shown in FIGS. 1A through 1B, the drive gearwheel 22 and the rotating body 21 together form a spur gearing 20. The gear teeth of the rotating body 21, together with the gear teeth of the drive gearwheel 22, have a flank play F (with F=F1+F2; see FIG. 2B) such that the drive gearwheel 22 can assume a neutral angular position with respect to the rotating body 21. This neutral angular position can be seen in FIG. 2B. In the neutral angular position, neither a leading nor a trailing tooth flank 24, 25 of the gear teeth of the drive gearwheel 22 is in contact with A corresponding leading or trailing tooth flank 26, 27 of the gear teeth of the rotating body 21. Thus, in the neutral angular position, the rotating body 21 and the drive gearwheel 22 do not touch.

The chucking device 10 further comprises an auxiliary drive 23, for example a servo motor, which can rotationally drive the drive gearwheel 22. As shown in FIG. 1A, the drive 23 can, for example, be fastened to the machine table 11. The drive 23 defines an auxiliary axis A2, which extends substantially parallel to the spindle axis A1. The rotational movement of the drive gearwheel 22 about the auxiliary axis A2 is designated ω2. The flank play F1, F2 may be selected such that even in the case of small variations of the angular velocity ω2 in relation to the angular velocity ω1, flank contact does not occur.

An angle measuring sensor 16, which is connected by circuitry to the controller 50, can be operatively associated with, e.g., seated on, the drive 23. The circuitry connection between the angle measuring sensor 16 and the controller 50 is identified by a reference sign s2.

The positioning of the angle measuring sensors 15 and 16 in FIG. 1A is to be understood as exemplary. They can be located anywhere as long as the actual positions of the spindle 21 are detectable by the first angle measuring sensor 15 and those of the drive gearwheel 22 are detectable by the second angle measuring sensor 16 (can be registered by the controller 50), and both the first angle measuring sensor 15 and also the second angle measuring sensor 16 can be read out or queried by the controller 50.

A measuring axis 32, which bears a measuring sensor 33 (a tracer pin here), can be arranged on the measuring structure 18. The measuring machine 100 can also comprise, for example, an X drive, a Y drive, and a Z drive, which are controlled by the controller 50. The X drive allows the measuring structure 18 to be moved in the X direction (see, e.g., FIG. 1B). The Y drive allows the measuring axis 32 to be moved out of the measuring structure 18 or to be retracted. The Z drive allows the measuring axis 32 to be moved upward or downward along the measuring structure 18.

The measuring machine 100 can further comprise a plurality of CNC-controlled axis drives, which are driven by the controller 50. The corresponding drives and control connections are not shown. FIG. 1A only shows the control connections s3 for controlling the drive 23 and s4 for controlling the drive 17, since the invention substantially only relates to the correct interaction of the rotational movements about the axis A1 and the auxiliary axis A2.

As shown in FIGS. 1A and 1B, the chucking means 14 includes three radially movably arranged chucking jaws 14.1, 14.2, 14.3 shown by three double arrows located next to the chucking jaws 14.1, 14.2, 14.3. FIG. 1A illustrates the chucking jaws 14.1, 14.2, 14.3 engaging a central borehole 31 of the chucked object 30 and clamping the chucked object 30 by moving the chucking jaws radially outwardly.

When the chucking means 14 is opened and/or closed, the rotating body 21 and the spindle 12 execute a rotational movement relative to each other about the spindle axis A1. During the opening and/or closing of the chucking means 14, the rotating body 21 must execute a rotational movement about the spindle axis A1 relative to the spindle 12. Either the spindle 12 is fixed (braked) and the rotating body 21 is rotated, or the rotating body 21 is fixed (braked) and the spindle 12 is rotated. In the latter case, the chucked object 30 (e.g., a workpiece) would co-rotate with the spindle 12. In some embodiments, the spindle 12 is provided with braking means, which is actuatable by the controller 50 in order to prevent a rotational movement of the spindle 12 about the spindle axis A1, and in order to be able to chuck or unchuck the chucked object 30 by the rotational driving of the drive gearwheel 22 by means of the drive 23. In one embodiment, for example, the spindle drive 17 is configured so as to be a braking means and transferred into a braking mode by the controller 50 to prevent rotational movement of the spindle 12 about the spindle axis A1 to chuck or unchuck the chucked object 30 by rotationally driving the gear wheel 22 by the drive 23 and rotating the rotating body 21. Depending on the construction of the spindle drive 17, the spindle drive 17 can be braked, for example, when activation is short-circuited or when a specific braking ramp is predefined on the activation side. In these embodiments, a relative rotational movement thus results between the rotating body 21 and the spindle 12, and the chucking means 14 are moved by this relative rotational movement such that the chucking means 14 chuck or unchuck the chucked object 30.

For example, as illustrated in FIG. 1B, if the drive gearwheel 22 in FIG. 1B makes a counter-clockwise angular movement ω2, the rotating body 21 is rotated clockwise by the drive gearwheel 22, as indicated by directional movement ω1. This situation is schematically illustrated in FIG. 2A. The leading tooth flank 24 of the drive gearwheel 22 contacts with the flank 26 of the rotating body 21 and transmits the drive torque to the rotating body 21. The spindle 12, the chucking jaws 14.1, 14.2, 14.3 and the chucked object 30 do not freely rotate since they are held by braking means, e.g., by the drive 17 operated in the braking mode. The drive torque is transmitted from the drive gearwheel 22 to the rotating body 21 (if desired with a step-up or step-down transmission) and causes the chucking means 14 to open or close.

If, for example, the topography of the chucked object 30 is to be measured using the measuring sensor 33 while this chucked object 30 is chucked in the chucking device 10, the chucked object 30 is rotated in a controlled manner about the spindle axis A1 by the controller 50. In this case, the rotating body 21 would interact with the drive gearwheel 22 and both the drive gearwheel 22 and the drive 23 would be rotated, even if the drive is deenergized. This would result in undesired measurement inaccuracies, which could be induced by a running inaccuracy of the spindle 12. In addition, the chucking action of the chucking device 10 could change due to friction forces in the system.

Therefore, according to embodiments of the invention, the drive gearwheel 22 is transferred relative to the rotating body 21 into the above-mentioned neutral angular position, which is indicated in FIG. 2B, before a measurement or machining is executed on the chucked object 30. Since a flank play is intentionally provided between the drive gearwheel 22 and the rotating body 21, a flank play F1 between the flanks 25 and 27 and a flank play F2 between the flanks 24 and 26 results in the neutral angular position.

In one embodiment, the flank play F=F1+F2 is at least 100 μm. If the chucked object 30 is not rotated, the rotating body 21 and the drive gearwheel 22 are also idle, i.e., ω1=ω2=0.

In some embodiments, the drive gearwheel 22 is rotated in unison with the rotating body 21 when the chucked object 30 is rotated. This aspect is indicated in FIG. 2B where the angular velocity ω1 points in the counter-clockwise direction and the angular velocity ω2 points in the clockwise direction.

By tracking in solidarity (active co-rotation), the drive gearwheel 22 is always held in the neutral angular position with respect to the rotating body 21. The co-rotation in solidarity is performed with the cooperation of the controller 50, which reads out or analyzes the angle measuring sensors 15, 16 for this purpose and executes the driving of the drive 17 and the drive 20 such that neutral angular position is also maintained during the rotation of the spindle 12 and the chucked object 30.

In some embodiments, the flank play F1, F2 is selected such that even in the case of small variations of the angular velocity ω2 in relation to the angular velocity ω1, flank contact does not occur.

In the neutral angular position, neither a leading tooth flank 24 nor a trailing tooth flank 25 of the gear teeth of the drive gearwheel 22 is in contact with the corresponding tooth flanks 26, 27 of the gear teeth of the rotating body 21.

As may be recognized by those of ordinary skill in the pertinent art based on the teachings herein, numerous changes and modifications may be made to the above-described and other embodiments of the present invention without departing from its scope as defined in the claims. Accordingly, this detailed description of embodiments is to be taken in an illustrative, as opposed to a limiting sense.

What is claimed is:

1. A chucking device, comprising:
   a rotationally-drivable spindle;
   chucking means for mechanical chucking or unchucking of a chucked object arranged on the spindle, the chucking means comprising a rotating body having gear teeth, each with a leading tooth flank and a trailing tooth flank, which allows the chucked object to be chucked or unchucked by relative rotational movement of the rotating body and the spindle;
   a drive gearwheel having gear teeth engagable with the gear teeth of the rotating body, each of the drive gearwheel gear teeth having a leading tooth flank and a trailing tooth flank, which are complementary to the gear teeth of the rotating body;
   a drive for rotationally driving the drive gearwheel, and
   a controller,
   wherein the gear teeth of the rotating body and the gear teeth of the drive gearwheel define a flank play so as to define a neutral angular position of the drive gearwheel with respect to the rotating body in which the leading tooth flank and the trailing tooth flank of the drive gearwheel and a corresponding leading tooth flank and trailing tooth flank of the rotating body are not in contact with each other; and
   the drive and the controller are configured and adapted to transfer the drive gearwheel relative to the rotating body into the neutral angular position and maintain said neutral angular position during rotation of the spindle and the chucked object.

2. The chucking device according to claim 1, further comprising a first angle measuring sensor operatively connected to the spindle and configured and adapted to detect a position of the spindle, and a second angle measuring sensor operatively connected to the drive and configured and adapted to detect a position of the drive, wherein the controller is configured and adapted to read the first angle measuring sensor and the second angle measuring sensor.

3. The chucking device according to claim 1, further comprising braking means for the spindle activatable to prevent a rotational movement of the spindle about a spindle axis such that the chucked object is chuckable or unchuckable by rotationally driving the drive gearwheel with the drive.

4. The chucking device according to claim 3, further comprising a spindle drive adapted and configured to rotationally drive the spindle about the spindle axis.

5. The chucking device according to claim 4, wherein the braking means includes the spindle drive, and the controller is configured and adapted to transfer the spindle drive into a braking mode.

6. The chucking device according to claim 3, wherein the drive defines a rotational axis that extends substantially parallel to the spindle axis.

7. The chucking device according to claim 1, wherein the controller is adapted and configured to determine power consumption of the drive and thereby determine one or more of successful chucking or chucking force during said chucking.

8. The chucking device according to claim 1, wherein the drive wheel includes a spur gear, the rotating body includes a pinion, and the drive gearwheel together with the rotating body define a spur gearing.

9. A system, comprising:
   a chucking device, comprising a rotationally-drivable spindle; chucking means for mechanical chucking or unchucking of a chucked object arranged on the spindle, the chucking means comprising a rotating body having gear teeth, each with a leading tooth flank and a trailing tooth flank, which allows the chucked object to be chucked or unchucked by relative rotational movement of the rotating body with respect to the spindle; a drive gearwheel having gear teeth engagable with the gear teeth of the rotating body, each of the drive gearwheel gear teeth having a leading tooth flank and a trailing tooth flank, which are complementary to the gear teeth of the rotating body; and a drive for rotationally driving the drive gearwheel, wherein the gear teeth of the rotating body and the gear teeth of the drive gearwheel define a flank play so as to define a neutral angular position of the drive gearwheel with respect to the rotating body in which the leading tooth flank and the trailing tooth flank of the drive gearwheel and a corresponding leading tooth flank and trailing tooth flank of the rotating body are not in contact with each other; and
   a CNC controller configured to provide and maintain said neutral angular position and readjust the drive gearwheel as necessary to maintain said neutral angular position during rotation of the spindle and the chucked object.

10. The system according to claim 9, wherein the system comprises a machine tool, a measuring machine, or a test stand.

* * * * *